United States Patent [19]

Liden

[11] Patent Number: 5,574,647
[45] Date of Patent: Nov. 12, 1996

[54] APPARATUS AND METHOD FOR COMPUTING WIND-SENSITIVE OPTIMUM ALTITUDE STEPS IN A FLIGHT MANAGEMENT SYSTEM

[75] Inventor: Sam P. Liden, Phoenix, Ariz.

[73] Assignee: Honeywell Inc., Minneapolis, Minn.

[21] Appl. No.: 131,069

[22] Filed: Oct. 4, 1993

[51] Int. Cl.[6] .......................... G06F 165/00; G06F 15/00; G06F 17/00

[52] U.S. Cl. .......................... 364/433; 364/442; 364/444; 364/446

[58] Field of Search .................................. 364/442, 444, 364/440, 433, 443, 420, 448; 73/178 R; 244/180–182, 183; 340/969, 970, 977, 978

[56] References Cited

U.S. PATENT DOCUMENTS

| | | | |
|---|---|---|---|
| 4,094,480 | 6/1978 | Nixon | 364/433 |
| 4,312,041 | 1/1982 | DeJonge | 364/442 |
| 4,325,123 | 4/1982 | Graham et al. | 364/431.07 |
| 4,536,843 | 8/1985 | Lambregts | 364/434 |
| 4,642,775 | 2/1987 | Cline et al. | 364/443 |
| 4,814,993 | 3/1989 | Zapryanov et al. | 364/442 |
| 4,827,417 | 5/1989 | Berger et al. | 364/442 |
| 4,843,575 | 6/1989 | Crane | 364/442 |
| 5,051,910 | 9/1991 | Liden | 364/446 |
| 5,121,325 | 6/1992 | DeJonge | 364/442 |
| 5,408,413 | 4/1995 | Gonser et al. | 364/446 |

OTHER PUBLICATIONS

R. Stengel and F. Marcus, "Energy Management Fuel Conservation in Transport Aircraft," IE[3] Transactions on AES, vol. AES–12, No. 4, Jul. 1976.

*Primary Examiner*—Kevin J. Teska
*Assistant Examiner*—Thai Phan
*Attorney, Agent, or Firm*—Charles J. Ungemach

[57] ABSTRACT

An apparatus and method for determining the best legal flight altitudes, and the best points at which to change to a new legal flight altitude, such that the cost of the flight is minimized, but subject to filtering to prevent excessive changes in altitude.

7 Claims, 8 Drawing Sheets

APPARATUS AND METHOD FOR COMPUTING WIND-SENSITIVE OPTIMUM ALTITUDE STEPS IN A FLIGHT MANAGEMENT SYSTEM

BACKGROUND OF THE INVENTION

1. Field of the Invention

The present invention relates to a method and apparatus for determining the best legal flight altitudes, and the best points at which to change to a new legal flight altitude, such that the cost of the flight is minimized, but subject to filtering to prevent excessive changes in altitude. The method of computation is part of, and an improvement on, computations that are performed by existing Flight Management Systems for an aircraft.

2. Description of the Prior Art

Most commercial aircraft produced in recent years come equipped with a Flight Management System (FMS). An FMS accepts pilot-entered input data that represents a flight plan from the origin airport to the destination airport. A flight plan is composed mostly of a sequence of waypoints that define the horizontal flight path. Also specified is the initial cruise altitude, and for long flights, points at which to initiate climb to a new cruise altitude to take advantage of cost savings available when gross weight is reduced. In general, as fuel is burned off and the aircraft loses weight, the optimum cruise altitude (the altitude that minimizes cost of flight) increases.

A part of the computations performed by an FMS is therefore to compute the best altitude to fly so that the cost of the flight is minimized. The optimum altitude is defined as the altitude that minimizes cost (a combination of fuel cost and time cost, to be described below), and depends on aircraft gross weight, speed, wind and air temperature. However, the aircraft is usually constrained to fly at legal altitudes, established by the International Civil Aviation Organization (ICAO) in order to maintain traffic separation. The change from one legal altitude to another is referred to as a "step climb" or a "step descent". A step climb or descent may be taken only upon approval by Air Traffic Control. Step climbs are much more common than step descents since optimum altitude generally increases as fuel is burned off. Some systems prohibit computed step descents in the planned flight profile.

Altitude step points may be pre-planned and manually placed at any waypoint. However, the FMS also computes optimum step points, to inform the pilot of the best location to initiate a step. Optimum step points are generally not at the waypoints. As the aircraft approaches a pre-planned or an optimum step climb point, the pilot requests permission from Air Traffic Control to step at that point. Permission may be denied, or the step point may have to be moved, due to traffic interference.

In order to present to the pilot information about future points in the flight, such as arrival time and distance to go at future waypoints, and locations of future step climb points, a process called "prediction" is performed by the FMS. The prediction process simulates future flight by advancing a set of state variables, S, starting at the current aircraft state, along the flight plan, to the destination. A typical set of state variables are: time, distance to destination, altitude, gross weight, true air speed and flight path angle. Other sets can be used. The prediction is computed in fast time to provide downpath information to the pilot as quickly as possible. It is performed by advancing S in "Prediction Intervals" that vary in size depending on the flight conditions (e.g. climbing at speed, level flight at speed, accelerating in climb). Speed at future points is obtained from a "speed generator" that gives the target speed for the selected speed mode. The "Econ" speed is designed to minimize cost, and uses gross weight, altitude, tail wind and a cost index (to be described below) as inputs. Tail wind is obtained from forecast wind data entered at waypoints in the flight plan. The prediction assumes that the steps will be taken as planned or computed.

In current systems, optimum altitude is typically computed using a lookup table that has been derived off-line by aerodynamic analysis for the specific aircraft, and is supplied as fixed data in the FMS software. This data table is based on the International Standard Atmosphere (ISA), with no winds, and with no deviations from the ISA temperature profile. With this table and with gross weight and speed (or equivalent variables) as input, the optimum altitude is computed as output. The method of computation is quick. Gross weight at future points is obtained from the prediction process. The speed generator is used to obtain aircraft speed for future points in the prediction process as well as for the current aircraft guidance function.

Figure 1:
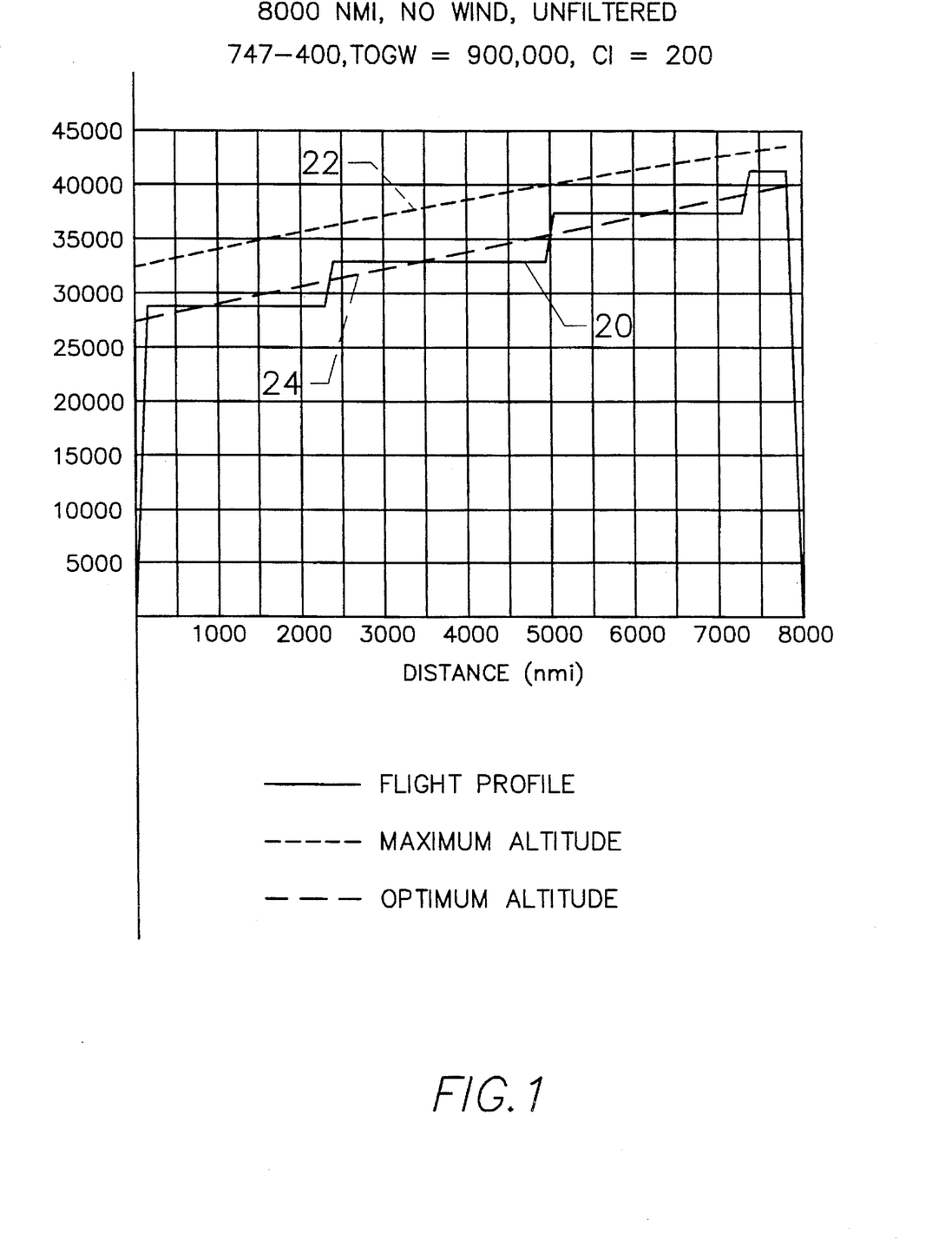
FIG. 1 is a graph showing a vertical flight profile, maximum altitude and optimum altitude for a simulated flight of a Boeing 747-400, with Pratt & Witney engines, on an east-bound 8000 nmi journey with no wind and with optimum step climbs.

While forecast winds and temperature deviations are used in doing the prediction, they are not used in computing optimum altitude. Accordingly, the table lookup method for finding the optimum altitude is feasible (ignoring wind) because the function is then continuous and well behaved. The optimum altitude without wind increases nearly linearly with distance as fuel is burned off. The optimum step climb point is then determined by the distance point where the optimum altitude lies half way between the current cruise altitude and the next legal altitude. A typical Flight Profile using this method is shown in FIG. 1, to be described below. FIG. 1 also shows maximum and optimum altitude profiles verses distance.

A problem is encountered in present systems because wind is not taken into account. Thus, the FMS will call for the predicted altitude change at the step climb or descent point even if the new altitude would result in less economical flight. For example, if the wind at the called-for altitude is an extream head wind, the system will not compute an alternate altitude where more favorable wind conditions exist.

SUMMARY OF THE INVENTION

The present invention is designed to take wind velocity and temperature into consideration and because wind may change significantly with altitude, changing to an altitude with increased tail wind or decreased head wind generally reduces the cost of flight. The wind at the aircraft position is obtainable from navigation and air data, but for prediction, winds at future points in a flight plan are needed. For optimum altitude computation, winds at various altitudes for future distance points are also needed. Current FM Systems permit entry of wind (magnitude and direction) and temperature forecast data at four altitudes at any waypoint in the flight plan. Climb and descent wind data may also be entered, but such data is not relevant to the invention. Forecast data may be entered manually, or it may be uplinked via a communication channel and entered automatically. It may also be updated as newer forecasts become available. Interpolation and extrapolation methods are use to estimate winds away from the data points. Although forecasts can never be precise, utilization of the available forecast data generally results in cost savings.

The optimum cruise altitude for an aircraft is the altitude that minimizes the Direct Operating Cost (DOC) of flight for a given ground distance. DOC, as used herein, is defined as the cost of the consumed fuel plus other costs that are proportional to flight time. In an FMS, the time-proportional cost is represented by a pilot-selectable "Cost Index" which is defined for English units as the non-fuel dollars per hour divided by 100 times the fuel dollars per pound and gives units of 100 pounds per hour. In metric units, the Cost Index is defined as the non-fuel dollars per minute divided by the fuel dollars per kilogram and gives units of 60 kilograms per hour. The metric Cost Index units are larger than the English units by a factor of about 1.3. The scaling of Cost Index is chosen to permit entry of typical values with three decimal digits. A typical value for a narrow-body aircraft like the Boeing 757 is around 50 or 60, and for a Boeing 757 is around 200 (in English units). The values to use are set by airline policy. Increasing the Cost Index results in higher speed and higher fuel cost. Minimum fuel cost results with the Cost Index equal to zero, but usually gives speeds that are too slow for schedule needs.

Direct Operating Cost for a given ground distance is then given by the equation:

$$DOC = cf \int_0^{te} (ff + k) dt \quad (1)$$

or by changing the variable of integration from time to distance:

$$DOC = cf \int_0^{xg} (ff + k)/vg \, dx \quad (2)$$

where cf=unit cost of fuel ($/lb or $/kg)
ff=fuel flow (lb/hr or kg/hr)
k=Cost Index scaled to units of ff
te=elapsed time (hr)
xg=ground distance (nmi)
vg=ground speed (kn)

The integrand of Equation (2) is referred to as the Specific Cost (SpCost):

$$SpCost=(ff+k)/vg (lb/nmi \text{ or } kg/nmi) \quad (3)$$

When English units are used (Cost Index has units of 100-lb/hr) then k=100×Cost Index, and SpCost has units of lb/nmi. When metric units are used (Cost Index has units of kg/nmi) then k=60×Cost Index and SpCost has units of kg/nmi. Ground Speed (vg) has units of kn (knots, or nmi/hr). In the above equations, ff and vg are measurable for the aircraft position, but for points ahead of the aircraft, modeling of the aircraft and the atmosphere is done as part of the normal prediction process of an FMS. In steady non-accelerating level flight, ff depends mostly on air speed, altitude, outside air temperature and gross weight for a given aircraft/engine configuration while vg depends on air speed, wind (magnitude and direction) and the aircraft track angle. Thus using these equations, temperature and wind conditions are taken into account.

More specifically, an FMS includes a mathematical model for computing ff in order to perform prediction, even without the benefits of this invention. This model is usually specified by the engine manufacturer and differs for each engine type and manufacturer. The ff model typically includes several data tables that have been derived experimentally. The ff model and data are usually proprietary to the engine manufacturer and may be reproduced only by permission. Some FMS's include models for more than one engine type, for aircraft that use various types of engines.

As mentioned, fuel flow for any engine depends mostly on the throttle setting, but also on weight, altitude, air temperature as well as on configuration/bleed settings for the cabin environmental control system (air conditioning, wing anti-icing, etc.) In non-accelerating cruise, total engine thrust is just equal to the aircraft drag, which is also determined by a mathematical drag model provided by the airframe manufacturer, and is subject to similar proprietary restrictions. The engines may be operated in various modes (such as maximum climb thrust, maximum continuous thrust, idle thrust etc.) for which the mathematical engine model must provide ff values.

The atmosphere data used by the aircraft drag and engine models is based on the ISA (International Standard Atmosphere). Deviations from the ISA temperature as well as winds are part of the weather forecast data and may be entered in the flight plan, and become part of the atmosphere model used at future points in the flight plan. The ground speed, vg, at future points is obtained by projecting the vector sum of forecast wind velocity and commanded airspeed into the aircraft horizontal course.

The "Econ" speed is defined as the air speed at any distance and altitude that minimizes SpCost. In an FMS, this speed is normally obtained from the speed generator, mentioned previously, which uses a table developed off-line for a specific aircraft to provide quick computation of the Econ speed. On-line search to find the minimum SpCost speed is possible but is generally too time consuming to be practical.

The "optimum altitude" at any distance point along the flight plan is defined as the altitude that minimizes the SpCost for the selected speed mode (usually "Econ"). If the speed mode is not "Econ" (for example, Long Range Cruise or manually selected constant speed), it is conventional to let k=0 in Equation (3) when computing the optimum altitude. Econ is assumed to be the selected speed mode in the following descriptions.

When wind varies irregularly with altitude, a table lookup scheme to find the optimum altitude is not practical for a variety of reasons, among these is the fact that the minimum point depends not only on the wind at the test altitude, but also on the winds at all other altitudes. Doing an on-line search to find the minimum SpCost altitude is also not practical. It is complicated by the fact that the SpCost versus altitude function may be multi-modal, having several local minimum points. An exhaustive search to find the minimum of multiple minimum points is therefore needed, which is excessively time consuming.

The aircraft is normally constrained to cruise only at prescribed legal altitudes, making it unnecessary to find the true optimum altitude. The following table lists the legal ICAO cruise altitudes that are normally adopted:

| Eastbound | Westbound |
| --- | --- |
| 19000 | 20000 |
| 21000 | 22000 |
| 23000 | 24000 |
| 25000 | 26000 |
| 27000 | 28000 |
| 29000 | 31000 |
| 33000 | 35000 |
| 37000 | 39000 |
| 41000 | 43000 |
| 45000 | 47000 |

Other altitudes may be legal altitudes under conditions where the pilot receives specific permission or in some foreign countries.

Doing an exhaustive search on the few legal altitudes available to the aircraft, those between minimum and miximum altitude (typically 3 or 4), is practical.

DETAILED DESCRIPTION OF THE PREFERRED EMBODIMENT

The simulated flight of FIG. 1 is graphed with the current method with optimum step climbs that do not take wind into consideration. The length of this flight approximately represents the maximum range of the 747–400 aircraft. The Cost Index is 200 (English units) and the International Standard Atmosphere is assumed. In FIG. 1, the flight profile is shown by the solid line 20, the maximum altitude is shown by the small dashed line 22 and the optimum altitude is shown by the large dashed line 24. The aircraft initiates a step climb at the point where the SpCost at the next higher legal altitude becomes equal to that at the current altitude. (Taking the distance of the climb into account, by locating the distance-center of the step where the SpCosts are lo equal, has been found to have negligible effect).

In newer FM Systems, wind and temperature data may be entered for 4 altitudes at each waypoint, either manually or automatically by data link from the ground. In future systems, automatic uplink is likely to provide even more comprehensive and detailed weather data. This makes it possible to include the effects of wind and temperature versus altitude in computing the optimum altitude. However, the optimum altitude profile will no longer be a nearly linear increasing altitude, but will often include segments of decreasing altitude with distance.

Figure 2:
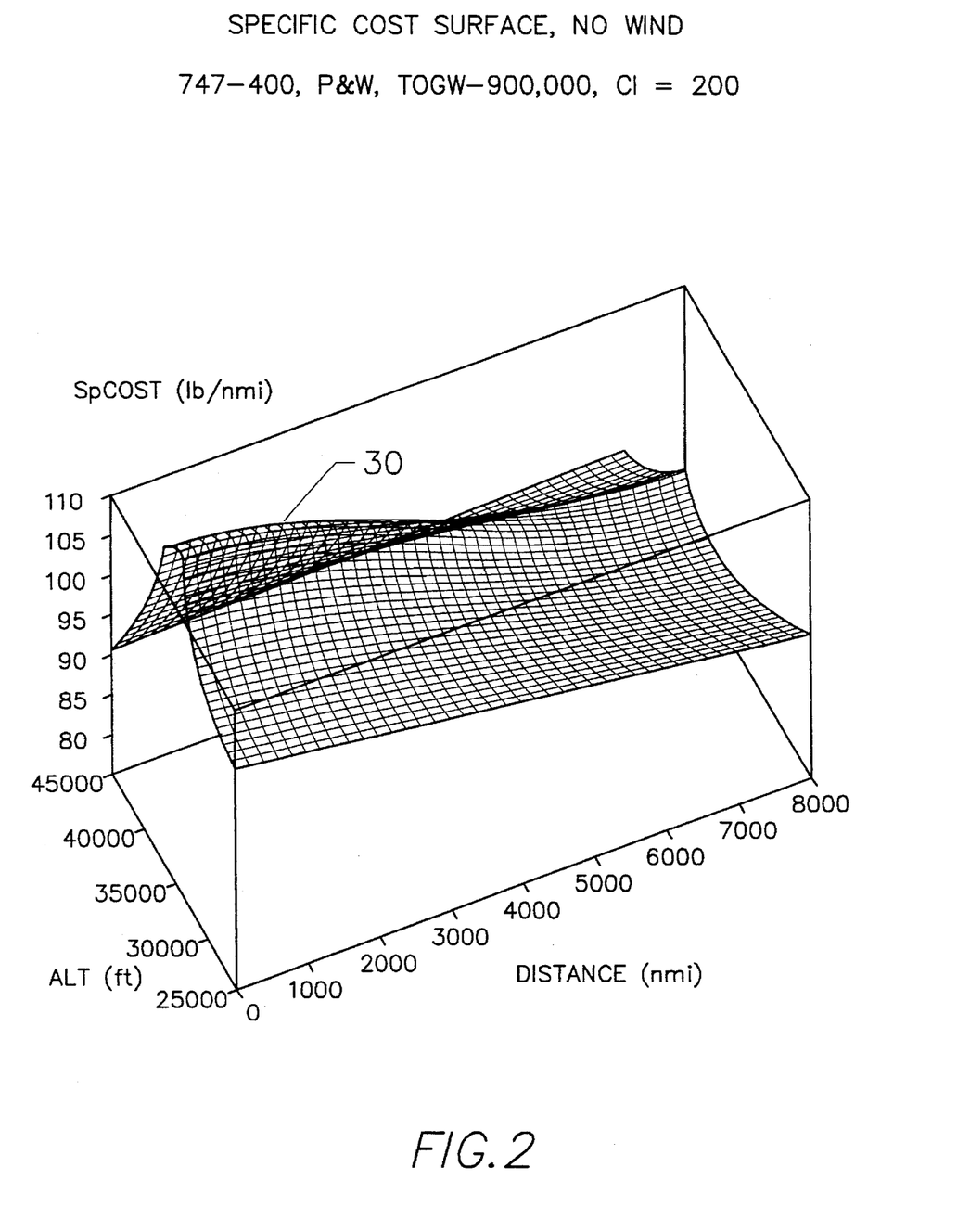
FIG. 2 is a three dimensional graph showing SpCost verses distance and altitude for the flight depicted in FIG. 1.

FIG. 2 shows a SpCost surface 30 for the no-wind flight case illustrated in FIG. 1. (The surface beyond the ridge is invalid and meaningless.) The optimum altitude for a given distance point lies at the bottom of the trough, and the optimum legal altitude is reasonably chosen to be the one closest to the optimum altitude since the trough is reasonably symmetric about the minimum point.

Figure 3:
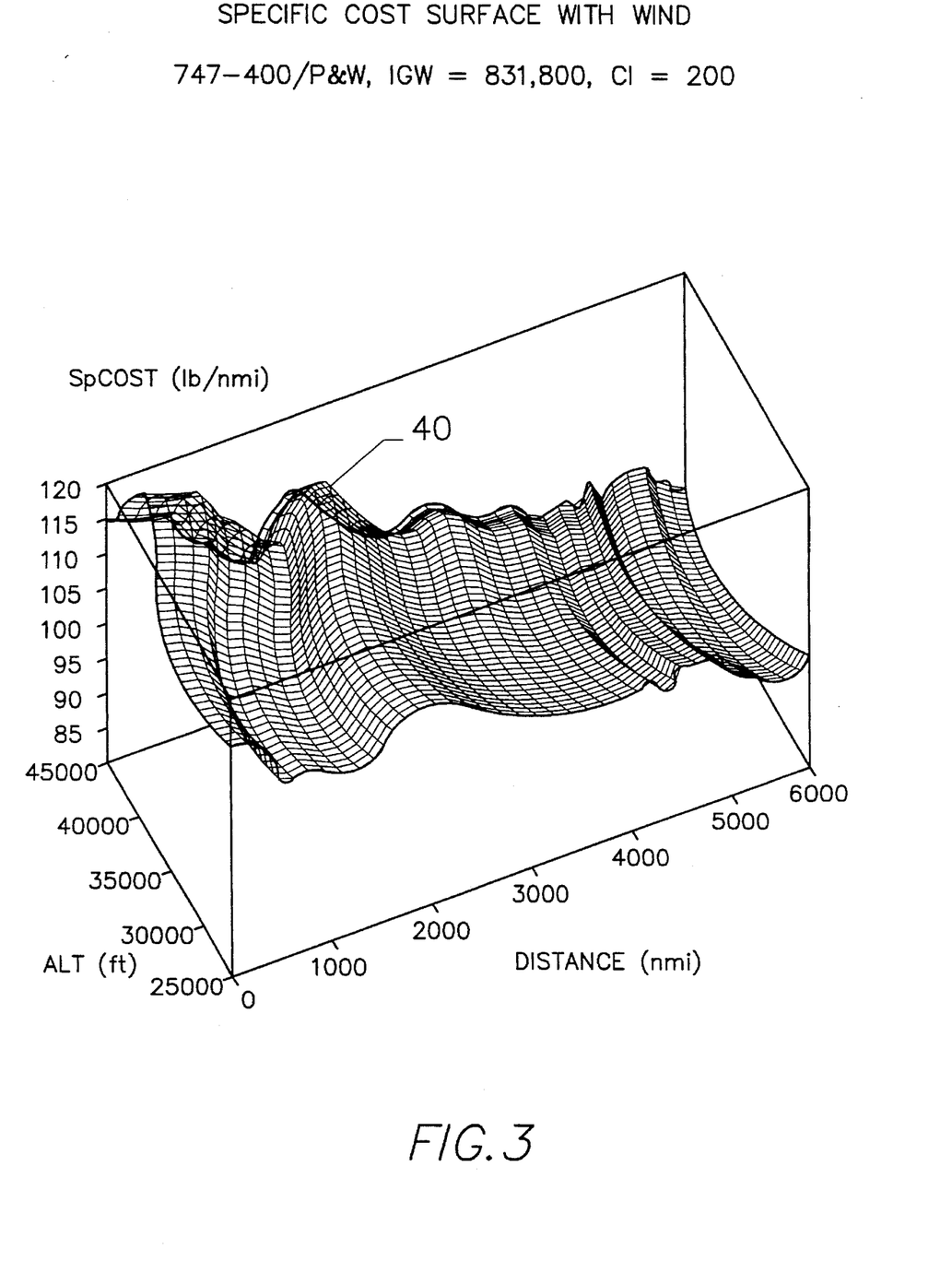
FIG. 3 is a three dimensional graph showing the SpCost verses distance and altitude for a particular 6500 mile west bound simulated flight from Los Angeles to Sydney Australia by a Boeing 747-400 with Pratt & Withey engines with wind data supplied by United Air Lines for a real flight.
Figure 4:
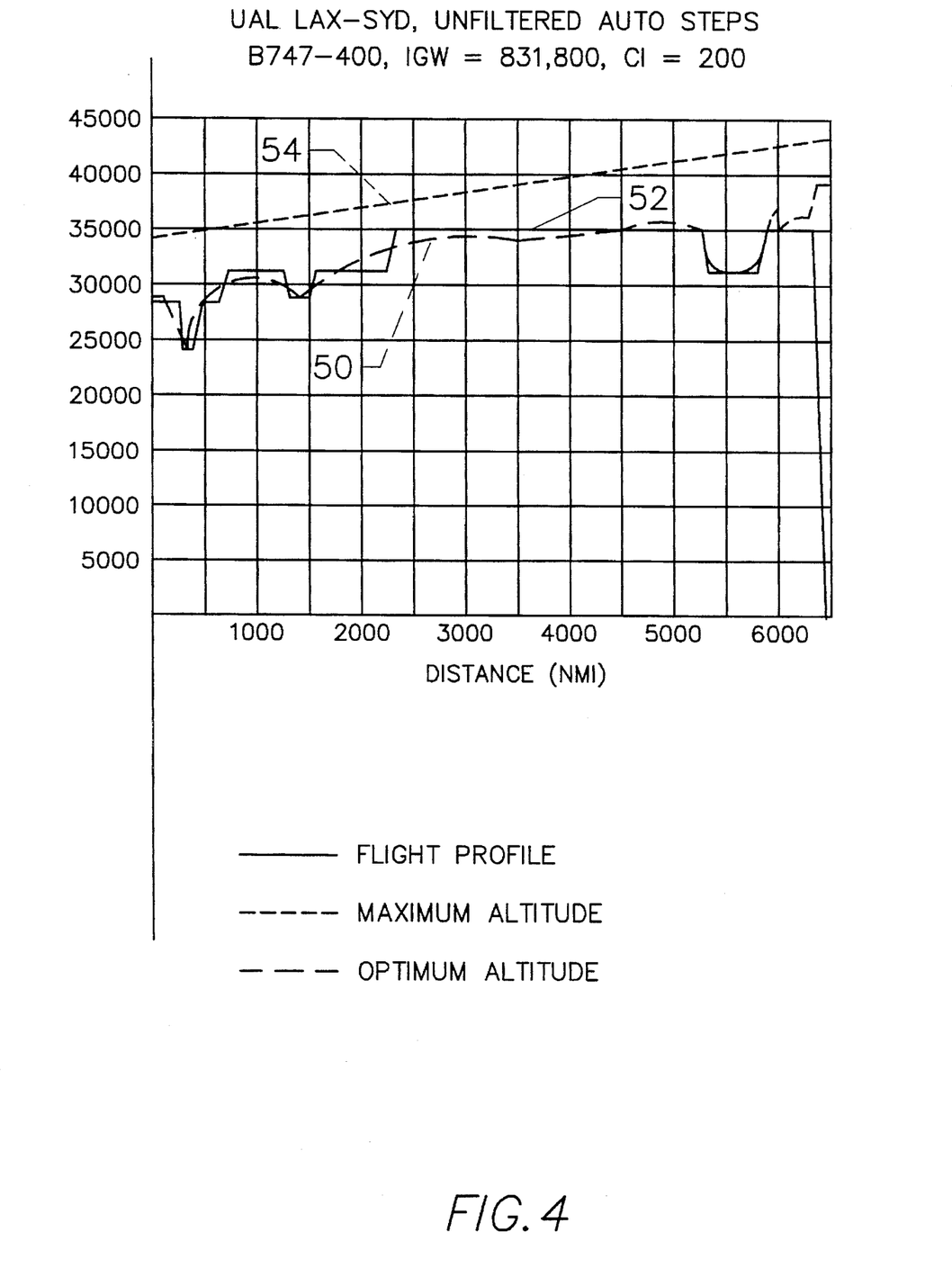
FIG. 4 is a graph showing the vertical flight profile, maximum altitude and optimum altitude for the flight of FIG. 3.

Next consider FIG. 3 which shows a flight of a Boeing 747-400 with Pratt & Witney engines from Los Angeles to Sydney Australia. The SpCost surface 40 is shown in a manner similar to FIG. 2 but the minimum point is no longer a nice linear function of distance, as shown by the long dashed optimum altitude line 50 in FIG. 4. FIG. 4 also shows the flight profile by solid line 52 and the maximum altitude by small dashed line 54. Flight profile 52 shows how the aircraft would fly if it were to always do a step climb or lo descent to the optimum legal flight level.

A flight profile that always steps to the optimum legal altitude is referred to herein as an unfiltered optimum profile. It will usually include undesirable "spikes" (steps followed by a step in the opposite direction within an unacceptable short distance) and "stutters" (steps followed by another step in the same direction within an unacceptably short distance). A very short spike will increase cost due to the cost of the increased thrust in climb, but a spike just long enough to reduce cost is generally too short to be acceptable operationally. Furthermore, some airlines and pilots concur in the opinion that step descents should not be automatically planned by the FMS. In a system where step descents are inhibited, a positive spike may cause a step climb to occur too early. The acceptable minimum distance threshold, and whether step descents should be allowed, are filter parameters to be specified as part of the system design. 500 nmi is about an hour of flight time and step climbs are not normally done more frequently than once an hour. The parameter value of 500 nmi with no step descent, is used in the following example.

The method of this invention is performed at the end of each normal Prediction Interval in the cruise phase where the state variables have been advanced by one step of the prediction process. The following computations are then done:

1. The maximum altitude at which flight is permitted (AltMax) is obtained from the FMS and the method for computing AltMax is not part of the present invention.
2. The minimum legal altitude at which flight is permitted to continue (AltMin) is defined. In systems where predicted step descents are prohibited, AltMin=AltCrz (the current cruise altitude at the prediction state). Otherwise, AltMin can be chosen to be the next legal altitude below AltCrz, for example.
3. For each legal altitude located at or above AltMin and at or below AltMax, a candidate legal optimum altitude (AltOptCand) is found for which the SpCost is minimum according to Equation (3). Fuel Flow (ff) and Ground Speed (vg) are computed by the same process used in doing normal prediction. Fuel Flow (ff) is computed at each trial altitude using the air speed that would be used for prediction at that altitude (for example, the Econ speed for a given Cost Index). k is a constant. Ground speed is the projection of the vector sum of forecast wind velocity and true air speed (TAS) onto the horizontal component of the flight path. The interpolated wind vector is obtained by interpolation of wind vectors stored at selected reference points (for example, at four different altitudes of waypoints in the flight plan). Although the reference points at which forecast winds are defined in current systems are waypoints of the flight plan, future systems may be able to accept forecast wind data at points defined by arbitrary latitude, longitude and altitude (for example, at the position of a nearby aircraft reporting its wind). Temperature data at such points is also used in computing fuel now (ff).
4. If the resulting AltOptCand should be different than the current target cruise altitude (AltCrz), then the following computations are made:
    4.1 The linear interpolation of the state variables (S) back to the distance point where SpCost at AltOpt-Cand and AltCrz are the same, using SpCost at the beginning of the interval for the same two altitudes. More Specifically:

| | |
|---|---|
| Let C11 = | SpCost at start of interval at AltCrz; |
| Let C12 = | SpCost at start of interval at AltOptCand; |
| Let C21 = | SpCost at end of interval at AltCrz; |
| Let C22 = | SpCost at end of interval at AltOptCand; |
| Let D1 = | C12 – C11 (will be greater than or equal to zero); and |
| Let D2 = | C22 – C21 (will be less than or equal to zero). |

Each state variable is then interpolated, from the start point to the end point of the interval, by the fraction D1/(D1–D2). The resulting set of state variables is referred to as a "candidate" step climb point, and is saved as S0. S will be returned to this point after each trial prediction.

4.2 Set up the following initial conditions for the loop of trial predictions in 4.3:
  4.2.1 Set up a termination at a distance X1, located at a distance DX (for example, 500 nmi) past S0 to cause the trial prediction to terminate at that distance.
  4.2.2 Let the initial AltTry (the altitude at which each trial prediction will be made)=AltMin.
  4.2.3 Let CostMin be the smallest DOC computed in Equation (6) below initially equal a very large number (for example $10^{10}$). Each iteration of the loop in 4.3 will replace CostMin with a new computed value if it is less than the previous value.

4.3 Repeat the following steps until AltTry is greater than AltMax:
  4.3.1 Let the altitude component of S=AltTry;
  4.3.2 Do a trial prediction until the distance component of S has reached X1. Refer to the S at this point as S1.
  4.3.3 Compute the DOC of the trial prediction by the equation:

$$DOC = FuelBurn + k \cdot FltTime \quad (6)$$

where FuelBurn=gross weight at S0 minus gross weight at S1, and FltTime=time at S1 minus time at S0.
  4.3.4 If DOC is less than CostMin:

| | |
|---|---|
| Let CostMin = | DOC computed in (6), and |
| Let AltOptLegal = | AltTry. |

4.3.5 Let S = S0 (go back to the starting point).
  4.3.6 Let AtltTry = next legal altitude above AltTry.
  4.3.7 Exit the repeat loop if AltTry is greater than AltMax.

4.4 Initialize for normal prediction from S=S0. If the AltOptLegal resulting from 4.3 is greater than AltCrz, start with a step climb to AltOptlegal. If AltoptLegal is less than SltCrz, start with a step descent to AltOptLegal. If AltOptLegal=AltCrz, continue prediction at this altitude without a step.

4.5 Inhibit additional step climbs or descents for a prescribed distance past S0 to prevent step climbs and/or descents form occurring too close together. This inhibit distance may be chosen to be different depending on whether a step climb, step descent, or no step is taken a S0. Let DC, DD and DN denote the inhibit distances for climb, descent and no step, respectively. DC and DD may also be chosen to be dependent on the size of the step.

Figure 5A:
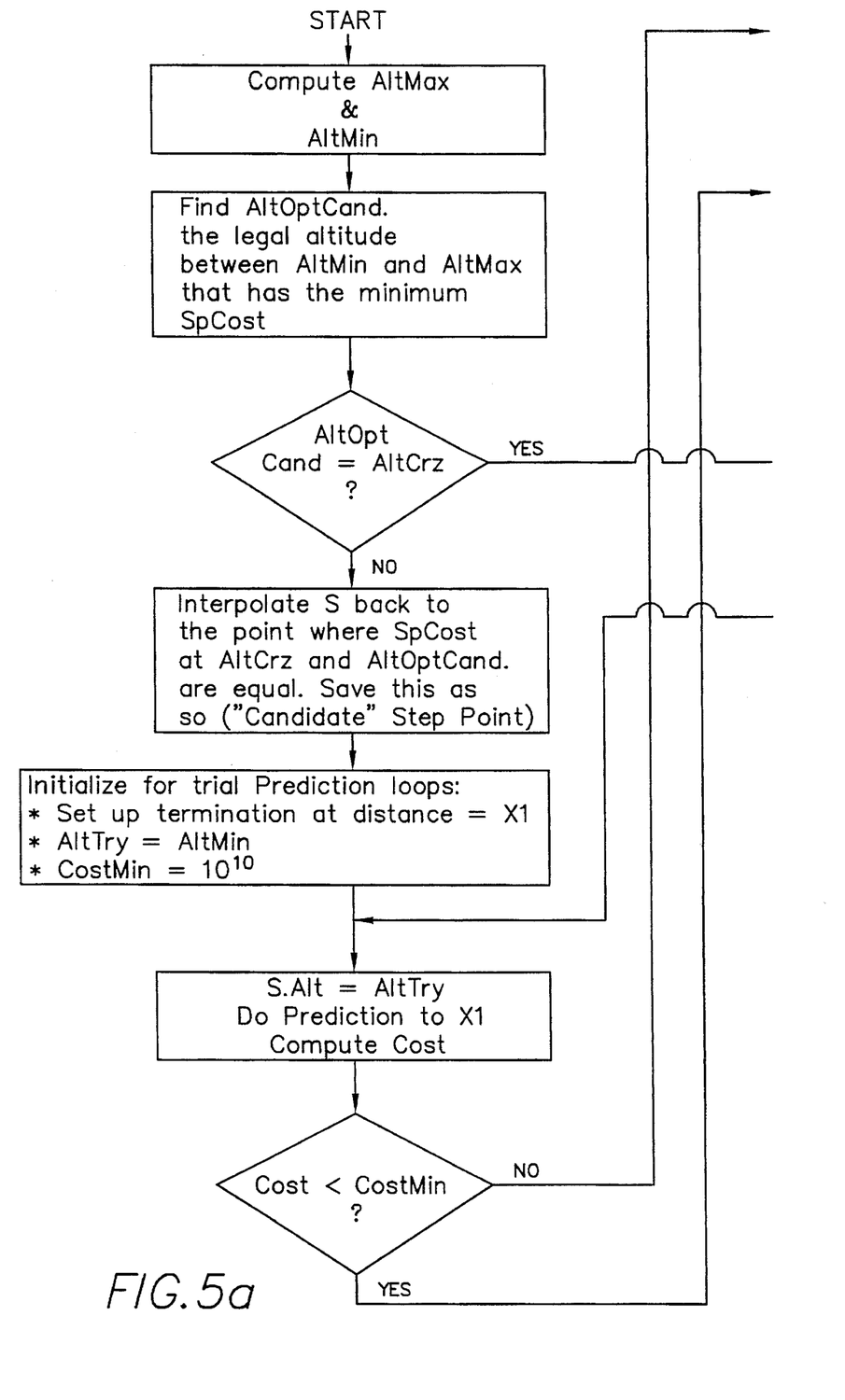
FIG. 5A and 5B show a flow diagram of the method of the present invention.
Figure 5B:
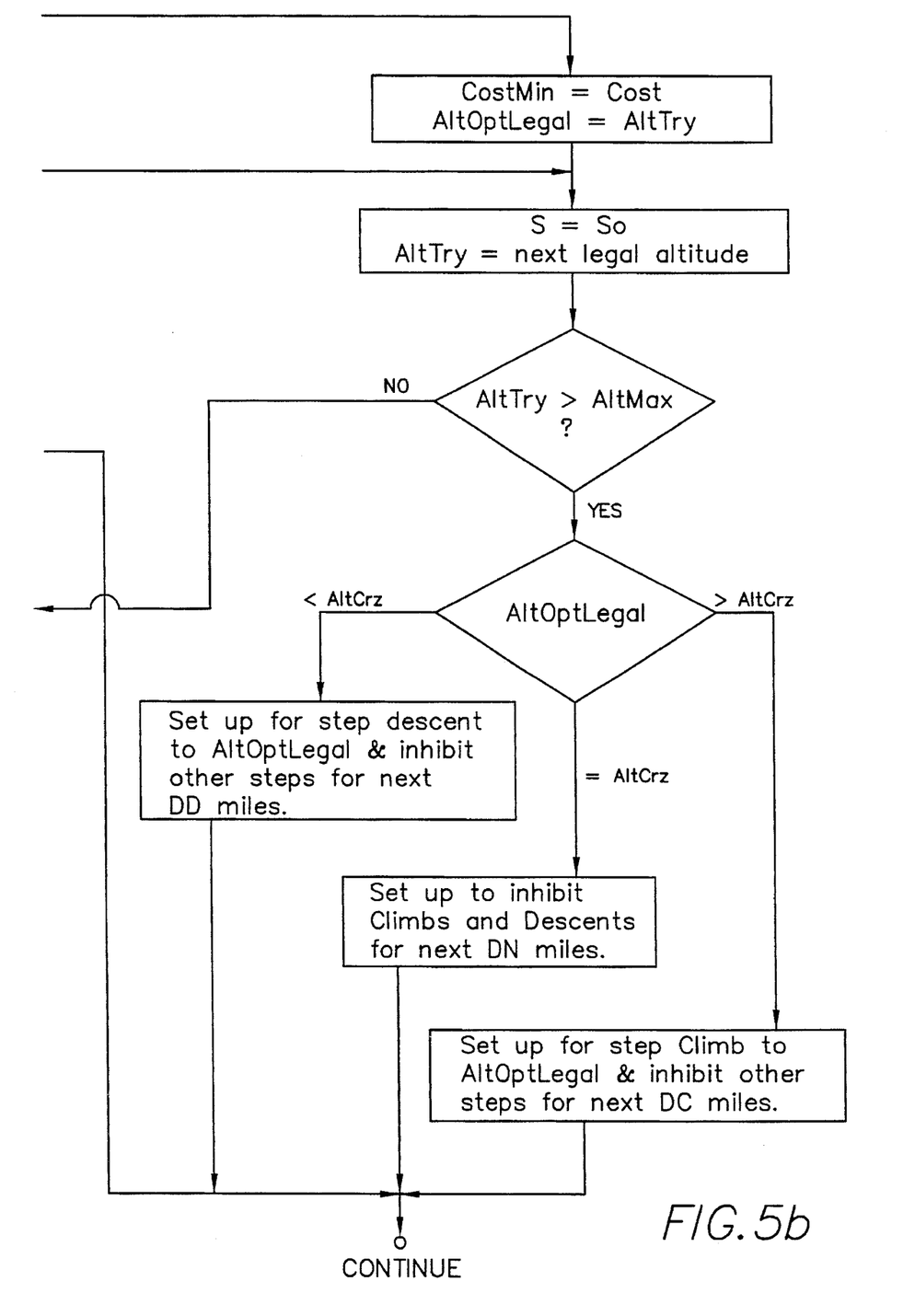

FIG. 5 shows a flow diagram illustrating the method above described.

It may at first seem incorrect to exclude the cost of the climb in doing the trial predictions at each altitude. But it has been observed in simulation studies that inclusion of the climb cost tends to penalize the higher test altitudes, giving delayed step climbs. In considering this issue, it is clear that, except for the last step of the flight, the cost of stepping is eventually paid, whether or not it occurs in the trial step interval. It therefore make sense to exclude the climb cost for all but the last step. The cost of doing the last step is partially compensated for by the earlier top of descent at the higher altitude. The complexity of computing the net cost of each of the last trial steps is deemed excessive, so no special provision is made for the net climb/descent cost of the last step.

When there is no wind, the filter serves no purpose, but its effect should cause no harm. The described filter has been found to have no effect when there is no wind.

Figure 6:
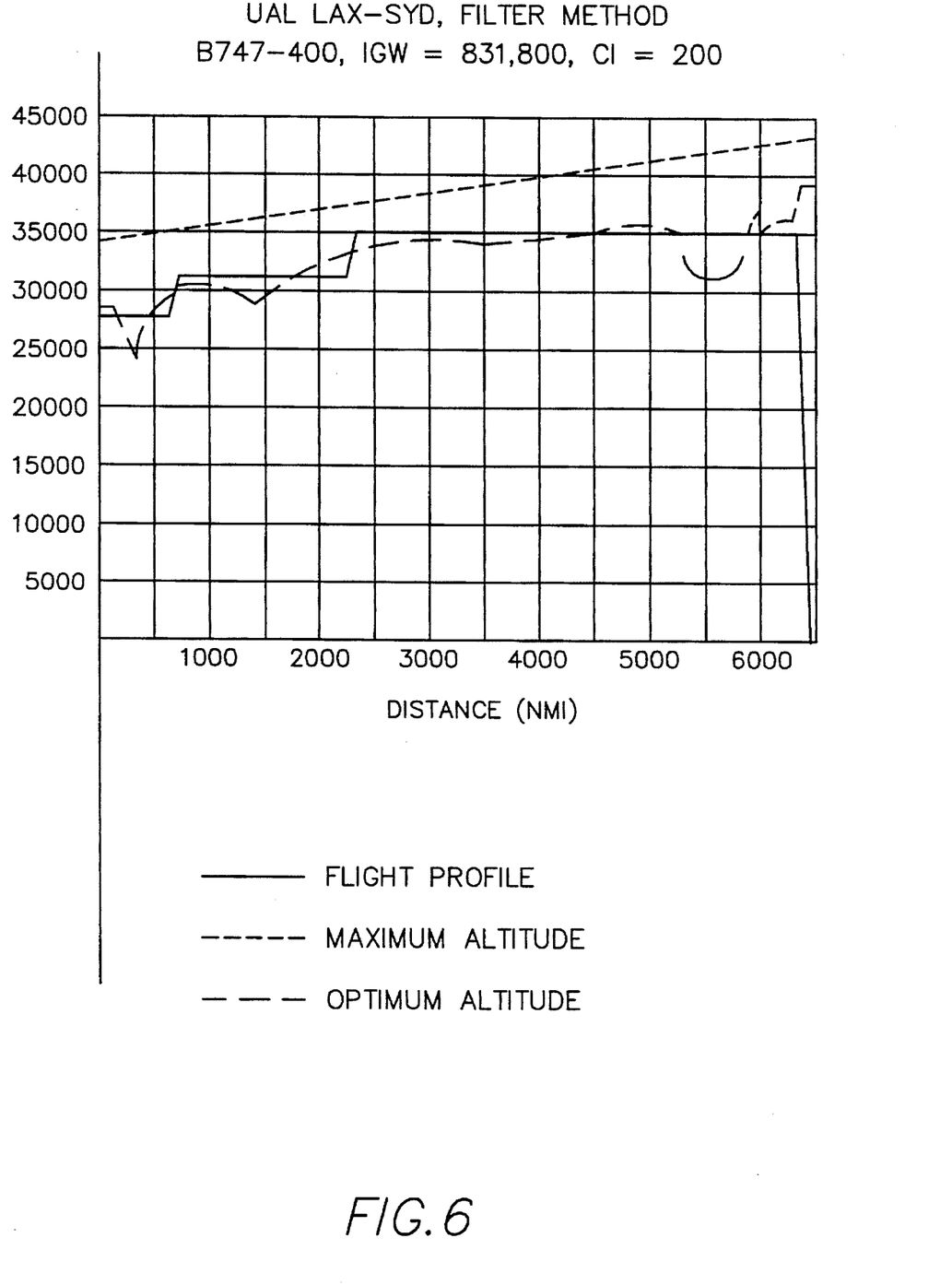
FIG. 6 is a graph showing the vertical flight profile, maximum altitude and optimum altitude for the flight shown in FIG. 4 but with the filtering method of this invention.

When the method is applied to the windy flight shown in FIG. 4, the flight profile shown in FIG. 6 results, using 500 nmi, for DC, DD and DN, and with step descents prohibited. This data was taken from an actual flight and is intended to be representative, and not specifically chosen to show as large a saving as possible. The following table shows the comparative results for this flight under 1) the current non-wind-sensitive method (NWS), 2) the unfiltered optimum method and 3) the filtered optimum method of this invention:

| METHOD | TIME (h:m:s) | FUEL BURN (LB) | DOC (LB/CI = 200) |
|---|---|---|---|
| NWS | 13:32:44 | 313,479 | 584,391 |
| UNFLT | 13:19:28 | 314,366 | 580,583 |
| FLTRD | 13:22:26 | 313,479 | 580,579 |

Figure 7:
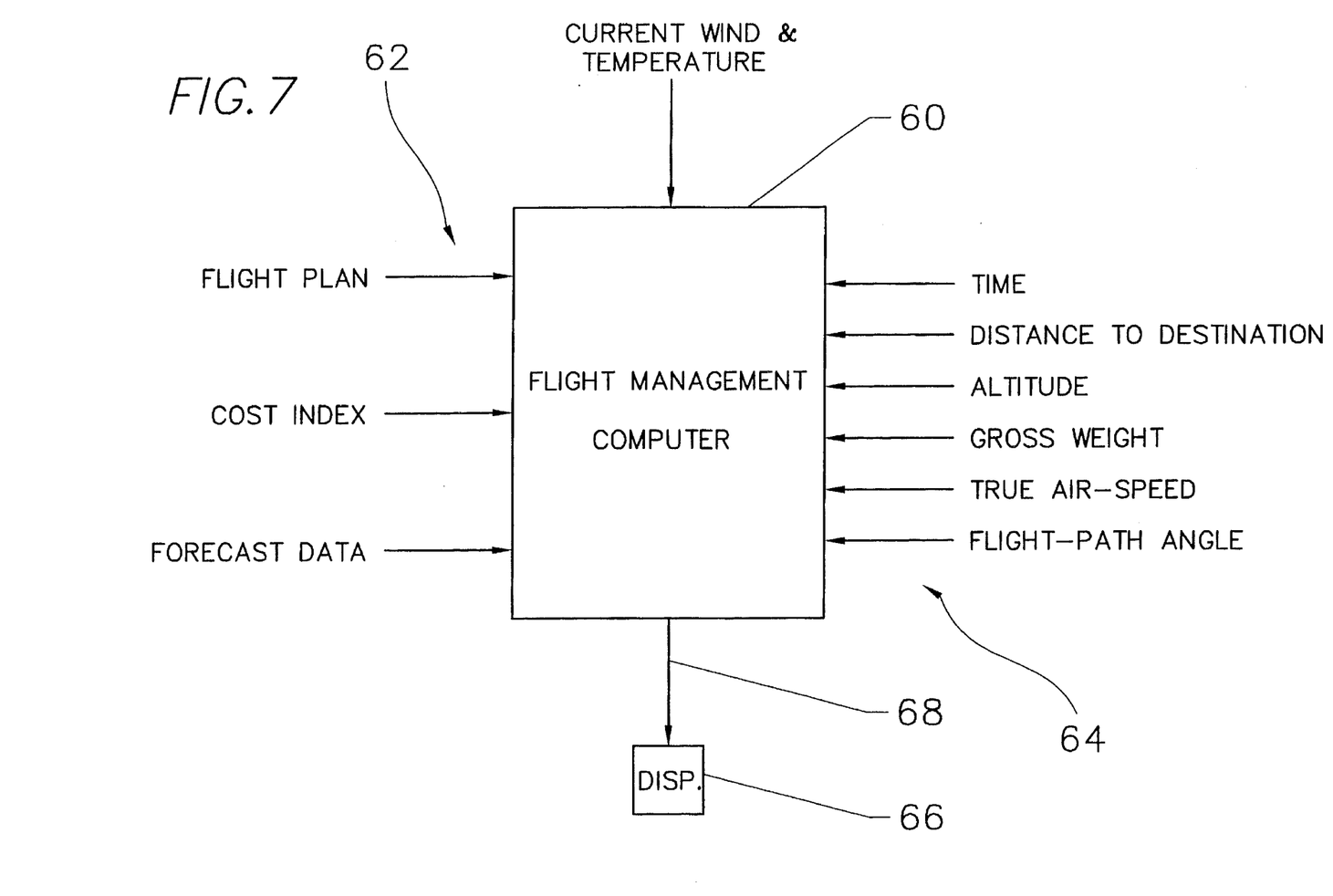
FIG. 7 is a block diagram showing one embodiment of the present invention.

FIG. 7 shows a block diagram of apparatus for use with the method above described. In FIG. 7, a computer 60 is shown having a first input set 62 for providing the computer with the information necessary for the initial generation of a flight profile. Such data includes flight plan data, the Cost Index and the forecast data (wind velocity and direction and temperature). Also the initial conditions for the state variables shown as a second set of inputs 64. The data on inputs 62 may be generated by a ground based computer prior to takeoff or pilot selected inputs. With this information, an initial vertical flight profile similar to that shown as solid line 20 in FIG. 1 may be generated. The second input set 64 provides the computer 60 with updated information as the flight progresses. A third input shown as input 65 which is the current wind and temperature conditions is also presented to computer 60. After the initial vertical flight profile has been generated, there will be changes in the initial state variables (time, distance to destination, gross weight, airspeed and flight path angle). The changes will be generated from detectors located on the aircraft. The computer will periodically update the forecast flight profile based on the new initial state values and generate new step climbs or descents in accordance with the methods described above. The current wind and temperature input 65 adjusts the forecast in the vicinity of the aircraft to improve the predictions a reletively short distance in front of the current aircraft position and is then blended out at further diastances. The newly generated profile is transmitted to a suitable display 66 via an output 68 so that the pilot may cause the aircraft to change altitude to a new level at the step point if he desires.

Thus, it is seen that I have provided a unique method and apparatus for establishing optimum altitudes within the operational limits, taking into account the parameters for wind and temperature which was not done by prior art systems. Although the present invention has been described with reference to the preferred method, workers skilled in the art will recognize that changes may be made to the details without departing from the spirit and scope of the invention.

What is claimed is:

1. The method of predicting the most economical legal altitudes to fly an aircraft over a flight plan, the method consisting of a sequence of prediction intervals the end of the last one of which defines the current state of that prediction interval and for which maximum and minimum permitted altitudes exist, comprising the steps of:

A. Determining the maximum and minimum permitted altitudes at the end of the interval;
   B. Determining the legal altitudes from the minimum to the maximum altitudes at the end of the interval;
   C. Calculating the Specific Cost for each such determined legal altitude utilizing the equation: $SpCost = (ff+k)/vg$ where
      SpCost is cost/unit distance, ff is fuel flow as determined from a function of air speed, altitude, temperature and gross weight, k is the non-fuel cost per unit time divided by the fuel cost/unit weight and vg is ground speed as determined from a function of true air speed and wind direction and velocity;
   D. Selecting a candidate legal altitude at which SpCost, calculated in step C is the lowest;
   E. Comparing the candidate legal altitude from step D with the altitude of the current state; and
      E1. If they are the same, continuing normal prediction without changing altitudes; or
      E2. If the candidate legal altitude is different than the altitude of the current prediction state, determining determine and saving a point in the prediction interval as the candidate step climb point the point being where specific costs at the prediction state altitude and the SpCost at the candidate legal altitude are equal;
   F. Predicting the direct operating cost of the flight for each of the legal altitudes of step B by performing a trial prediction over a pre-determined distance interval for each such legal altitude: and
   G. Comparing the direct operating cost for each such legal altitude from step F and identifying that one which gives the lowest direct operating cost.

2. The method of claim 1 further including the step:
   H. Comparing the identified altitude with the current prediction state altitude and,
      H1. if the same, inhibiting climbs and descents for a distance DN;
      H2. if identified altitude is greater than the prediction state altitude, doing a step climb to that altitude and inhibiting further step climbs and descents for a distance DC; and
      H3. if identified altitude is less than the prediction state altitude, doing a step descent to that altitude and inhibiting further step climbs and descents for a distance DD.

3. Apparatus for determining the lowest cost altitude profile at which to fly an aircraft, comprising:
   a flight management computer having a first plurality of inputs including a flight plan, a cost index and weather forecast data;
   a second plurality of inputs representing the state variables of the aircraft flight connected to the computer; said computer receiving the inputs and predicting (simulating) flight along the flight plan and computing the cost per unit time for each legal altitude between a predetermined minimum and maximum altitude from the equation $SpCost=(ff+k)/vg$ where ff is fuel flow and a function of air speed, altitude, temperature and gross weight, k is a constant cost index scaled to the units of ff and vg is ground speed and a function of true air speed and forecast wind direction and velocity, said computer selecting the altitude which has the least cost.

4. Apparatus according to claim 3 wherein the second set of inputs includes time input means, distance to destination input means, altitude input means, gross weight input means, true airspeed input means and flight path angle input means.

5. Apparatus according to claim 3 further including current wind and temperature input means connected to the computer.

6. Apparatus according to claim 4 further including current wind and temperature input means connected to the computer.

7. Apparatus according to claim 3 further including display means connected to the computer.

* * * * *

UNITED STATES PATENT AND TRADEMARK OFFICE
CERTIFICATE OF CORRECTION

PATENT NO. : 5,574,647
DATED : November 12, 1996
INVENTOR(S) : Sam P. Liden

It is certified that error appears in the above-indentified patent and that said Letters Patent is hereby corrected as shown below:

Column 9, line 22, cancel "(i" and substitute --(f--

Column 9, line 39, cancel "determine"

Signed and Sealed this

Eighteenth Day of February, 1997

Attest:

BRUCE LEHMAN

*Attesting Officer*  *Commissioner of Patents and Trademarks*